United States Patent
Liu et al.

(10) Patent No.: US 11,437,709 B2
(45) Date of Patent: Sep. 6, 2022

(54) ELECTRONIC DEVICE WITH ADVANCED ANTENNA

(71) Applicant: GUANGDONG OPPO MOBILE TELECOMMUNICATIONS CORP., LTD., Guangdong (CN)

(72) Inventors: Huanhong Liu, Guangdong (CN); Haijun Tang, Guangdong (CN); Qing Wu, Guangdong (CN); Guolin Liu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 46 days.

(21) Appl. No.: 16/149,290

(22) Filed: Oct. 2, 2018

(65) Prior Publication Data

US 2019/0207298 A1    Jul. 4, 2019

(30) Foreign Application Priority Data

Dec. 29, 2017  (CN) .......................... 201711499643.5
Dec. 29, 2017  (CN) .......................... 201721927245.4

(51) Int. Cl.
*H01Q 1/24* (2006.01)
*H01Q 1/16* (2006.01)
(Continued)

(52) U.S. Cl.
CPC .............. *H01Q 1/243* (2013.01); *H01Q 1/16* (2013.01); *H01Q 1/2266* (2013.01); *H01Q 1/52* (2013.01); *H04M 1/0266* (2013.01)

(58) Field of Classification Search
CPC ............ H01Q 1/243; H01Q 1/16; H01Q 1/52; H01Q 1/2266; H04M 1/0266
See application file for complete search history.

(56) References Cited

U.S. PATENT DOCUMENTS 8,712,233 B2 * 4/2014 Gibbs .................. H05K 5/0217
                                                               396/535
9,137,891 B2 * 9/2015 Gibbs .................... G06F 1/1698
(Continued)

FOREIGN PATENT DOCUMENTS

CN         203521588 U        4/2014
CN         203521617 U        4/2014
(Continued)

OTHER PUBLICATIONS

International search report,PCT/CN2018/113016,dated Jan. 30, 2019(9 pages).

(Continued)

*Primary Examiner* — Awat M Salih (57) ABSTRACT

The present disclosure provides an electronic device with advanced antenna. The electronic device includes: a display screen; a metal frame surrounding a side edge of the display screen; and a connecting component disposed between the side edge of the display screen and a top end of the metal frame; wherein a height of the connecting component is larger than a preset height such that a portion of the side edge of the display screen not facing the metal frame has at least the preset height. Since the height of the connecting component is larger than the preset height such that the area of the portion of the side edge of the display screen which faces directly the metal frame may be smaller than a predetermined value. Thus, interruption between the display screen and the metal frame may be reduced or eliminated.

20 Claims, 5 Drawing Sheets

(51) Int. Cl.
  *H01Q 1/22*  (2006.01)
  *H01Q 1/52*  (2006.01)
  *H04M 1/02*  (2006.01)

(56) References Cited

U.S. PATENT DOCUMENTS

| | | | | |
|---|---|---|---|---|
| 2013/0016486 A1* | 1/2013 | Allore | ...................... | H04M 1/18 361/753 |
| 2016/0233581 A1* | 8/2016 | Kim | ........................ | H01Q 1/243 |
| 2017/0142241 A1* | 5/2017 | Kim | ........................ | H04M 1/026 |
| 2017/0302771 A1 | 10/2017 | Kim et al. | | |
| 2019/0081394 A1* | 3/2019 | Edwards | ................ | H01Q 1/243 |

FOREIGN PATENT DOCUMENTS

| | | | |
|---|---|---|---|
| CN | 104638361 | * | 5/2015 |
| CN | 104638361 | A | 5/2015 |
| CN | 104935695 | * | 9/2015 |
| CN | 104935695 | A | 9/2015 |
| CN | 204697050 | U | 10/2015 |
| CN | 108023181 | A | 5/2018 |
| CN | 208045691 | U | 11/2018 |
| WO | WO2017156900 | A1 | 9/2017 |

OTHER PUBLICATIONS

European search report, EP18201528, dated Apr. 26, 2019 (9 pages).
First Office Action from China patent office in a counterpart Chinese patent Application 201711499643.5, dated Jul. 29, 2019 (7 pages).
Indian First Examination Report, Indian Application No. 201814040483, dated Jul. 19, 2020 (5 pages).
European examination report, European Application No. 18201528.9, dated Sep. 4, 2020 (9 pages).
European examination report, European Application No. 18201528.9, dated Dec. 9, 2020 (6 pages).

* cited by examiner

ELECTRONIC DEVICE WITH ADVANCED ANTENNA

CROSS-REFERENCE TO RELATED APPLICATIONS

The present application claims foreign priority of Chinese Patent Application No. 201711499643.5, filed on Dec. 29, 2017 and Chinese Patent Application No. 201721927245.4 filed on Dec. 29, 2017 in the State Intellectual Property Office of China, the entire contents of which are hereby incorporated by reference.

TECHNICAL FIELD

The described embodiments relate to electronic devices, and in particular to an electronic device with advanced antenna.

BACKGROUND

The screen-to-body ratio of electronic devices such as mobile phone and laptop has become higher and higher such that space for the clearance area of antenna has become more and more limited. In a bezel-less electronic device, the clearance area of antenna is very limited. As known, the display screen may influence the performance of the antenna. Thus, how to reduce the influence of the display screen to the antenna is an important factor during the design of electronic devices, especially for those having bezel-less screen.

SUMMARY

According to a first aspect of the present disclosure, an electronic device with advanced antenna is provided and includes a display screen, a metal frame, and a connecting component. The metal frame is configured to surround a side edge of the display screen, and at least a part of the metal frame is configured as antenna radiator. The connecting component is disposed between the side edge of the display screen and a top end of the metal frame, and the connecting component includes insulating material. An overlapped height is existed between the side edge of the display screen and the metal frame.

According to a second aspect of the present disclosure, an electronic device is provided and includes a display screen, a metal frame, and a connecting component. The metal frame is configured to surround a first portion of a side edge of the display screen and spaced apart from the side edge of the display screen. At least a portion of the metal frame is configured as antenna radiator. An overlapped height is existed between the side edge of the display screen and the metal frame. The connecting component is configured to surround and clung to the side edge of the display screen, and the connecting component includes insulating material, The connecting component abuts a top end of the metal frame such that a second portion of the side edge of the display screen clung to the connecting component does not face the metal frame.

BRIEF DESCRIPTION OF THE DRAWINGS

In order to clearly explain the technical solutions in the embodiments of the present disclosure, the drawings used in the description of the embodiments will be briefly described below. Obviously, the drawings in the following description are merely some embodiments of the present disclosure. For those of ordinary skill in the art, other drawings may also be obtained based on these drawings without any creative work.

DETAILED DESCRIPTION

The disclosure will now be described in detail with reference to the accompanying drawings and examples. Apparently, the described embodiments are only a part of the embodiments of the present disclosure, not all of the embodiments. All other embodiments obtained by a person of ordinary skill in the art based on the embodiments of the present invention without creative efforts shall fall within the protection scope of the present invention.

In the specification, it is to be understood that terms such as "thickness" should be construed to refer to the orientation as then described or as shown in the drawings under discussion. These relative terms are for convenience of description and do not require that the present disclosure be constructed or operated in a particular orientation. In addition, terms such as "first" and "second" are used herein for purposes of description and are not intended to indicate or imply relative importance or significance or to imply the number of indicated technical features.

Figure 1:
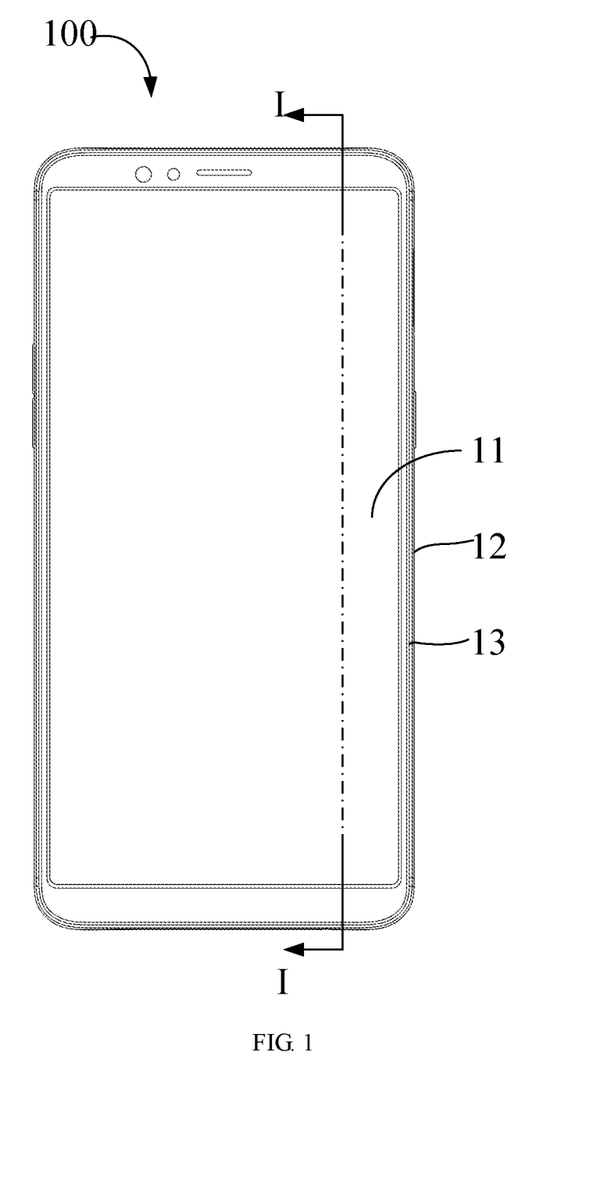
FIG. 1 is a top view of an electronic device according to an embodiment of the present disclosure.
Figure 2:
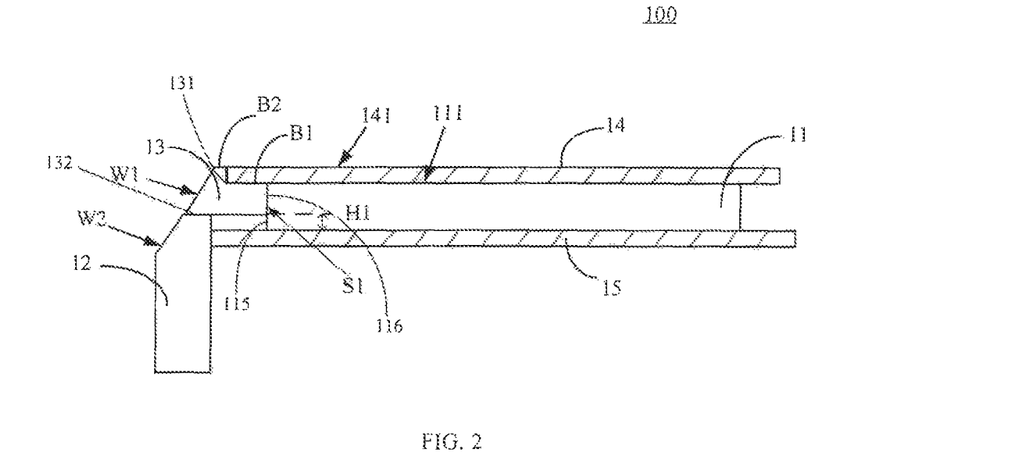
FIG. 2 is a section view of the electronic device of FIG. 1 taken along the line I-I according to an embodiment of the present disclosure.

Referring to FIGS. 1 and 2, FIG. 1 is a top view of an electronic device 100, which shows the front-side structure of the electronic device 100, and FIG. 2 is a section view of the electronic device 100 taken along the line I-I and shows some of the components inside. The electronic device 100 may include a display screen 11, a metal frame 12 arranged surrounding the side edge S1 of the display screen 11, and a connecting component 13 located between the side edge S1 of the display screen 11 and the top end of the metal frame 12. The height of the connecting component 13 may be larger than a preset height, such that the portion 116 of the side edge S1 of the display screen 11 which does not face directly the metal frame 12 may have at least the preset height.

As shown in FIG. 2, the top end of the metal frame 12 and the side edge S1 of the display screen 11 may be substantially perpendicular and form a step. The connecting component 13 may be set at the position of the step such that the outer surface of the electronic device may be smooth and continuous. Since the height of the connecting component 13 is larger than the preset height, the area of the portion 115 of the side edge S1 of the display screen 11 which faces directly the metal frame 12 may be less than a predetermined value. Thus, interruption between the display screen 11 and the metal frame 12 may be reduced or eliminated.

In some embodiments, the top portion 131 of the connecting component 13 may be substantially flush with the upper surface 111 of the display screen 11. The bottom portion 132 of the connecting component 13 may abut the top end of the metal frame 12. In this circumstance, the thicker the connecting component 13 is, the farther the top end of the metal frame 12 is away from the upper surface 111 of the display screen 11. In other words, the overlapped height H1 between the side edge S1 of the display screen 11 and the metal frame 12 may be smaller. Accordingly, the area of the portion 115 of the side edge S1 of the display screen 11 which faces directly the metal frame 12 may be smaller.

The upper surface 111 may refer to the surface of the display screen 11 close to the front-side of the electronic device 100. The top end of the metal frame 12 may refer to the end of the metal frame 12 close to the front-side of the electronic device 100.

In some embodiments, at least a portion of the metal frame 12 may be configured as antenna radiator for transmitting and receiving signals. The preset height may be determined based on actual requirement. Specifically, the value of the preset height may satisfy that the influence of the display screen 11 to the metal frame 12 configured as the antenna radiator is less than a predetermined value. That is, when the height of the connecting component 13 is larger than the preset height, the portion 115 of the display screen 11 which faces directly the metal frame 12 may be small enough to make the influence of the display screen 11 to the metal frame 12 configured as antenna radiator to be less than the predetermined value.

In some embodiments, the predetermined value of the influence may be, for example but not limited to, $\frac{1}{10}$ or $\frac{1}{8}$ of the maximal radiation power of the antenna.

As shown in FIG. 2, the electronic device 100 may further include a cover plate 14. The cover plate 14 may cover the display screen 11 and be utilized to protect the display screen 11. The size of the cover plate 14 may be larger than the display screen 11. The cover plate 14 may extend outside the display screen 11 in the extending direction of the display screen 11.

As shown in FIG. 2, part of the top portion 131 of the connecting component 13 may be located under the cover plate 14 such that the connecting component 13 may be embedded between the cover plate 14 and the metal frame 12.

In some embodiments, the connecting component 13 may be made of insulating material such as plastic and ceramic.

As shown in FIG. 2, the top portion 131 of the connecting component 13 may include a fitting portion B1 and a protrusion portion B2. The fitting portion B1 may be the part of the top portion 131 of the connecting component 13 located under the cover plate 14. The fitting portion B1 may be clung to the cover plate 14. The fitting portion B1 may be substantially flush with the upper surface 111 of the display screen 11. The protrusion portion B2 may extend from the fitting portion B1 to the side edge of the cover plate 14, and may cover the side edge of the cover plate 14. The height from the fitting portion B1 to the bottom portion 132 of the connecting component 13 may be larger than the preset height, such that the portion 116 of the side edge S1 of the display screen 11 which does not face directly the metal frame 12 may have at least the preset height.

In some embodiments, the protrusion portion B2 may extend to be substantially flush with the upper surface of the cover plate 14. The outer surface W1 of the protrusion portion B2 may be smoothly connected to the outer surface W2 of the metal frame 12 and the upper surface 141 of the cover plate 14. That is, the cover plate 14 and the metal frame 12 of the electronic device 100 may be smoothly connected to present an integral structure. There is no gap between the metal frame 12 and the cover plate 14.

It should be understood that, not all the components of the electronic devices 100 are shown in FIG. 2. Various components such as the back case are omitted for simplicity and clarity.

Figure 3:
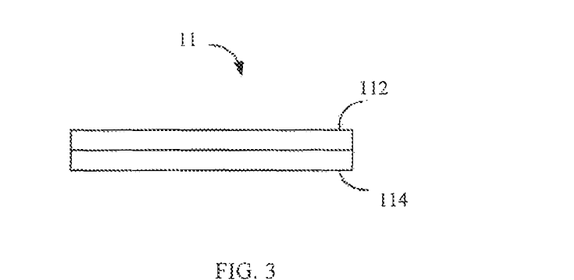
FIG. 3 is a side view of a display screen according to an embodiment of the present disclosure.

Referring to FIG. 3, FIG. 3 is a side view of the display screen 11. In this embodiment, the display screen 11 may be a touch-control display screen which includes a display panel 114 and a touch-control panel 112 covering the display panel 114.

The display panel 11 may be utilized to display images while the touch-control panel 112 may be utilized for user input and human-machine interaction.

Figure 4:
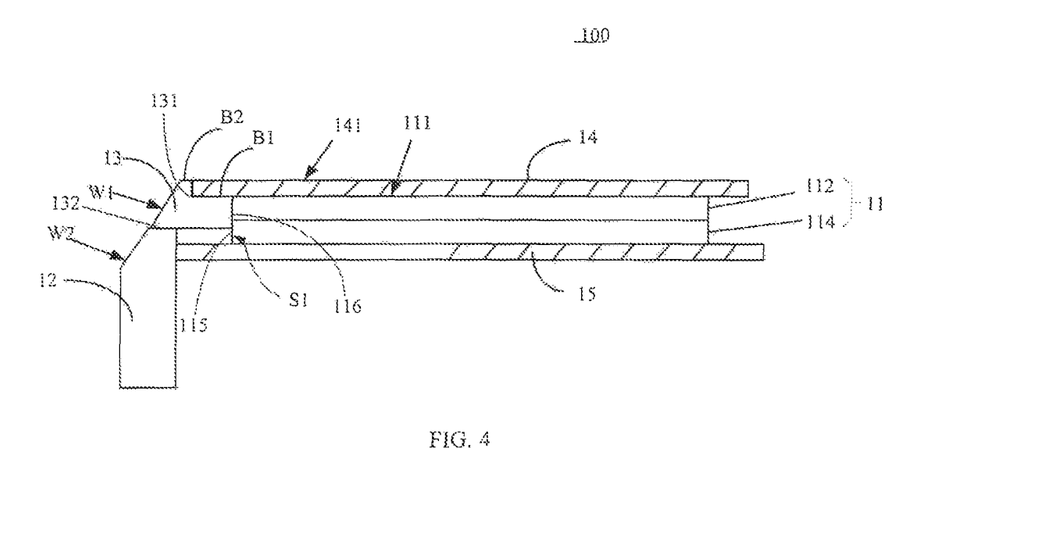
FIG. 4 is a section view of the electronic device of FIG. 1 taken along the line I-I according to another embodiment of the present disclosure.

Referring also to FIG. 4, FG. 4 is a section view of the electronic device shown in FIG. 1 taken along the line I-I according to another embodiment of the present disclosure. In this embodiment, the display screen 11 may include a display panel 114 and a touch-control panel 112.

As shown in FIG. 4, in some embodiments, the connecting component 13 may be the touch panel frame which covering closely the side edge of the touch-control panel 112. In this embodiment, the connecting component 13 may also cover part of the side edge of the display panel 114.

In some embodiments, the connecting component 13 used as the touch panel frame may only cover the side edge of the touch-control panel 112. In this situation, the whole side edge of the display panel 114 may directly face the metal frame 12. In other embodiments of the present disclosure, the connecting component 13 may cover at least part of the side edge of the display panel 114 such that the location of the metal frame 12 may be lower, i.e., the area of the portion 115 of the side edge S1 of the display screen 11 (including the display panel 114 and the touch-control panel 112) which faces directly the metal frame 12 may be smaller. Thus, the influence of the display screen 11 to the performance of the metal frame 12 used as antenna radiator may he reduced.

In some embodiments, the connecting component 13 may cover $\frac{1}{3}$ of the thickness of the side edge of the display panel 114. It should be understood that, in other embodiments, this ratio may be determined properly based on actual requirement. For example, the connecting component 13 may alternatively cover $\frac{2}{3}$ of the thickness of the side edge of the display panel 114.

Referring to FIG. 2 or FIG. 4, in some embodiments, the electronic device 100 may further include a support frame 15. The support frame 15 may support the display screen 11.

There may exist a gap between the metal frame 12 and the side edge S1 of the display screen 11. The distance between the support frame 15 and the metal frame 12 may be less than the distance between the metal frame 12 and the side edge S1 of the display screen 11.

Specifically, as shown in FIG. 2 or FIG. 4, the support frame 15 may be clung to the metal frame 12. The display screen 11 may be disposed on the support frame 15. The side edge S1 of the display screen 11 and the edge of the metal frame 12 which abuts the support frame 15 may be spaced apart by a preset distance. That is, the side edge S1 of the display screen 11 may be spaced apart from the metal frame 12 by the preset distance.

The support frame 15 may be made of insulating material such as plastic.

Figure 5:
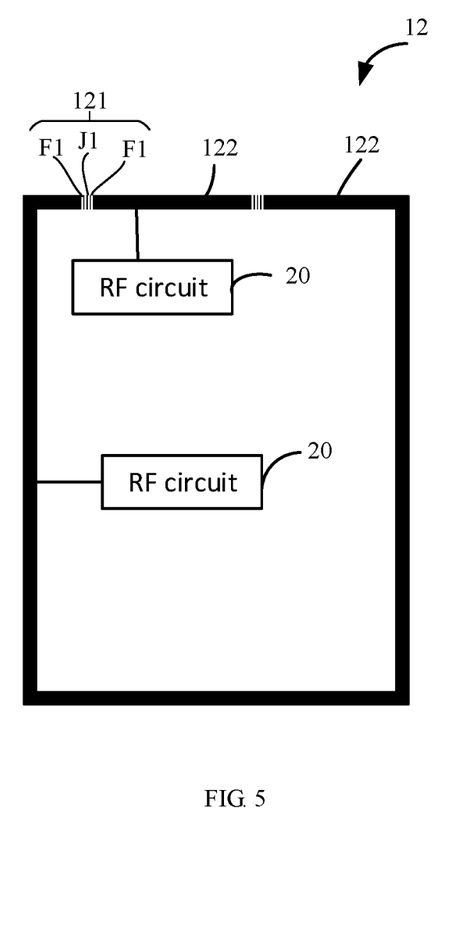
FIG. 5 is a top view of a metal frame according to an embodiment of the present disclosure.

Referring also to FIG. 5, FIG. 5 is a top view of a metal frame 12 according to an embodiment of the present disclosure. In some embodiments, the metal frame 12 may be a closed frame surrounding four side edges S1 of the display screen 11.

The metal frame 12 may define at least one spacing portion 121. The spacing portion 121 may divide the metal frame 12 into at least one independent frame-body 122.

As shown in FIG. 3, the electronic device 100 may further include a radio frequency (RF) circuit 20. Each independent frame-body 122 may be utilized as an independent antenna radiator, and may be connected to a respective RF circuit 20 to transmit or receive signals in a same frequency range or different frequency ranges.

As shown in FIG. 5, the number of the spacing portions 121 may be two. In this situation, the metal frame 12 may be divided into two independent frame-bodies 122 which may be utilized as antenna radiator. Accordingly, there may be two RF circuits 20, and the two RF circuits 20 may be utilized to generate signals in different frequency ranges. The two RF circuits 20 may electrically connect to the two frame-bodies 122 respectively. Therefore, each frame-body 122 may be utilized as the antenna radiator of a respective RF circuit 20 and to transmit and receive signals in the respective frequency range.

In some embodiments, the spacing portion 121 may be a micro-seam band. As shown in FIG. 5, the spacing portion 121 may include at least two micro-seams F1 spaced apart. A metal strip J1 may be disposed between the two micro-seams F1. The length direction of the metal strip J1 (i.e., the extending direction of the metal strip J1) and the width direction of the metal frame 12 (i.e., the direction from the top end to the bottom end) may be parallel.

The width of the spacing portion 121 may be 1.5 mm, 5.0 mm or range from 1.5 mm to 5.0 mm. The width of the micro-seam F1 may be 0.05 mm, 0.3 mm or range from 0.05 mm to 0.3 mm. The micro-seam F1 may be filled with signal shielding material, such as insulating material (e.g., plastic). The width of the metal strip J1 may be 0.1 mm, 0.5 mm or range from 0.1 mm to 0.5 mm.

The two RF circuits 20 may be any two of GSM (global system for mobile communication) RF circuit, CDMA (code division multiple access) RF circuit, Bluetooth RF circuit, WIFI RF circuit or NFC RF circuit.

In some embodiments, all the frame-bodies 122 of the metal frame 12 may be utilized as antenna radiators and may be connected with the corresponding RF circuits 20. In this circumstance, the four side edges S1 of the display screen 11 may be spaced apart from the metal frame 12 by a preset distance.

Figure 6:
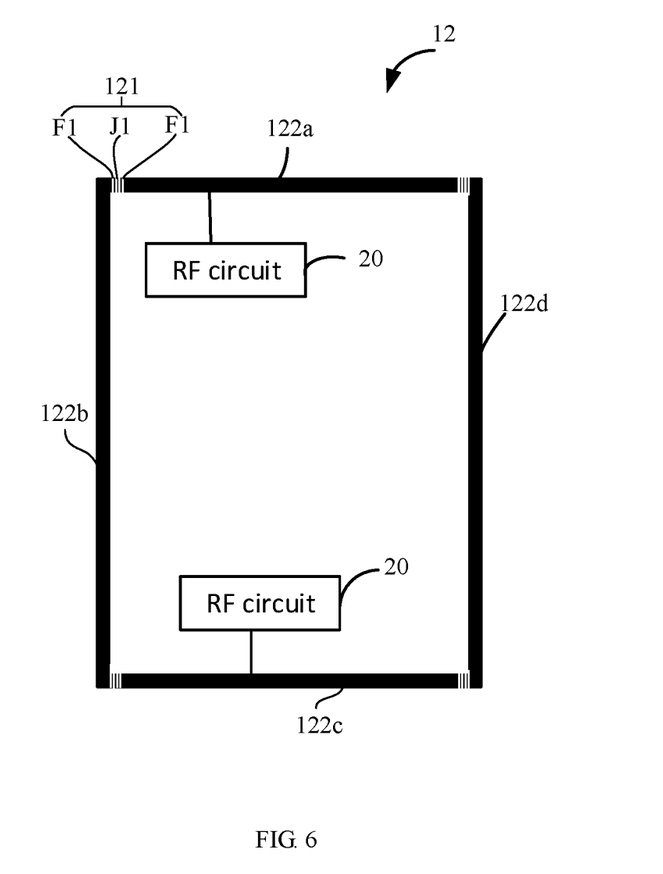
FIG. 6 is a top view of a metal frame according to another embodiment of the present disclosure.

Referring to FIG. 6, FIG. 6 is a top view of a metal frame 12 according to an embodiment of the present disclosure. In this embodiment, there may be four spacing portions 121, such that the metal frame 12 may be divided into four independent frame-bodies 122. The frame-body 122a and the frame-body 122c may be respectively located at two opposite first side edges, and the frame-body 122b and the frame-body 122d may be respectively located at two opposite second side edges. In this embodiment, the electronic device 100 may be of a rectangular shape including four side edges. The metal frame 12 may be utilized as the side frame of the electronic device 100 and also have four side edges. As shown in FIG. 6, the four spacing portions 121 may be located close to the four corners of the metal frame 12.

In this embodiment, the frame-bodies 122a and 122c located respectively at the two opposite first side edges are utilized as antenna radiators. The number of the RF circuits 20 may be two. The two RF circuits 20 may be configured to generate signals in different frequency ranges. The two RF circuits 20 may electrically connect to the two frame-bodies 122a and 122c located at the two opposite first side edges respectively. Thus, the frame-bodies 122a and 122c located at the two opposite first side edges may be used as antenna radiators for different RF circuits 20, and to transmit and receive signals in different frequency ranges.

Figure 7:
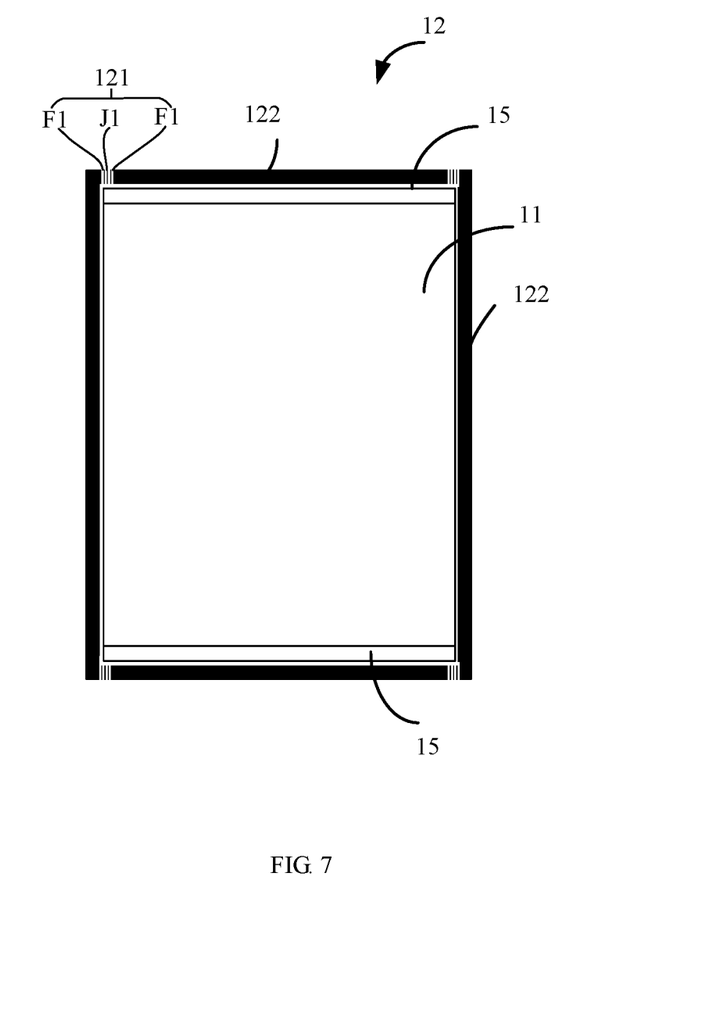
FIG. 7 illustrates the position relation between a metal frame, a display screen and a support frame according to an embodiment of the present disclosure.

Referring to FIG. 7, FIG. 7 illustrates the position relation between a metal frame 12, a display screen 11 and a support frame 15 according to an embodiment of the present disclosure.

In some embodiments, the two frame-bodies 122 located at the two opposite first side edges of the metal frame 12 are utilized as antenna radiators of RF circuits 20. The side edges S1 of the display screen 11 facing the two frame-bodies 122 configured as antenna radiator may be spaced apart from the frame-bodies 122 by a first preset distance. The other side edges S1 of the display screen 11 which does not face the frame-bodies 122 configured as antenna radiators may be spaced apart from the from the frame-bodies 122 by a second preset distance. The second preset distance may be smaller than the first preset distance. For example, the first preset distance may be 5 mm, and the second preset distance may be 2 mm. Thus, the bezel-less effect may be achieved in the premise that the performance of the frame-bodies of the metal frame 12 configured as antenna radiators is not influenced by the display screen 11. In some embodiments, the side edges S1 of the display screen 11 which face the frame-bodies 122 not utilized as antenna radiators may be clung to the frame-bodies 122 not utilized as antenna radiators. Therefore, bezel-less effect may be achieved.

In some embodiments, the two opposite first side edges may be the two short edges, and the two opposite second edges may be the two long edges.

The two RF circuits 20 may be any two of GSM (global system for mobile communication) RF circuit, CDMA (code division multiple access) RF circuit, Bluetooth RF circuit, WIFI RF circuit or NFC RF circuit.

It should be understood that, the RF circuits 20 may include a RF transmitting and receiving circuit and corresponding auxiliary circuits.

The spacing portion 121 may be a micro-seam band. The spacing portion 121 may include at least two micro-seams F1 spaced apart. A metal strip J1 may be disposed between the two micro-seams F1. The length direction of the metal strip J1 (i.e., the extending direction of the metal strip J1) and the width direction of the metal frame 12 (i.e., the direction from the top end to the bottom end) may be parallel.

The width of the spacing portion 121 may be 1.5 mm, 5.0 mm or range from 1.5 mm to 5.0 mm. The width of the micro-seam F1 may be 0.05 mm, 0.300 or range from 0.05 mm to 0.3 mm. The micro-seam F1 may be filled with signal shielding material, such as insulating material (e.g., plastic). The width of the metal strip J1 may be 0.1 mm, 0.5 mm or range from 0.1 mm to 0.5 mm.

The electronic device 100 may be a cell phone, a laptop and the like.

In the electronic device 100 of the present disclosure, the metal frame 12 may be utilized as antenna radiator. The performance of antenna may be improved. Since the area of the display screen 11 facing directly the metal frame 12 is reduced, the influence of the display screen 11 to the performance of the metal frame 12. Thus, the performance of the metal frame 12 as antenna radiator may be improved.

The foregoing is merely embodiments of the present disclosure, and is not intended to limit the scope of the disclosure. Any transformation of equivalent structure or equivalent process which uses the specification and the accompanying drawings of the present disclosure, or directly or indirectly application in other related technical fields, are likewise included within the scope of the protection of the present disclosure.

What is claimed is:

1. An electronic device with advanced antenna, comprising:
   a display screen;
   a metal frame surrounding a side edge of the display screen, wherein at least a part of the metal frame is configured as antenna radiator; and
   a connecting component disposed between the side edge of the display screen and a top end of the metal frame, wherein the connecting component comprises insulating material;
   wherein a projection of a part of the display screen along a direction perpendicular to a thickness direction of the display screen locates directly on the at least part of the metal frame;
   wherein a height of the part of the display screen is smaller than a thickness of the display screen;
   a space is defined between the part of the display screen and the at least part of the metal frame antenna radiator, and the connecting component is disposed out of the space.

2. The electronic device of claim 1, further comprising:
   a cover plate covering the display screen;
   wherein a size of the cover plate is larger than a size of the display screen, and the connecting component is embedded between the cover plate and the metal frame.

3. The electronic device of claim 2, wherein a top portion of the connecting component comprises a fitting portion and a protrusion portion;
   the fitting portion is clung to the cover plate;
   the protrusion portion extends from a fringe of the fitting portion to a side edge of the cover plate, and covers the side edge of the cover plate; and
   a height from the fitting portion to a bottom portion of the connecting component is larger than a preset height, wherein the preset height satisfies that an influence of the display screen to the metal frame configured as the antenna radiator to be less than ⅛ of a maximal radiation power of the antenna.

4. The electronic device of claims 1, wherein
   the display screen comprises a display panel and a touch-control panel covering the display panel; and
   the connecting component covers a side edge of the touch-control panel and at least a portion of a side edge of the display panel.

5. The electronic device of claims 1, further comprising a support frame supporting the display screen;
   the metal frame is spaced apart from the side edge of the display screen, and a distance between the support frame and the metal frame is less than a distance between the metal frame and the side edge of the display screen.

6. The electronic device of claims 1, wherein
   the metal frame comprises at least one spacing portion, the at least one spacing portion divides the metal frame into at least one independent frame-body, and the at least one independent frame-body is configured as an independent antenna radiator.

7. The electronic device of claim 6, wherein
   each of the at least one independent frame-body is used as the independent antenna radiator; and
   four side edges of the display screen are spaced apart from the metal frame.

8. The electronic device of claim 6, wherein
   a number of the at least one spacing portion is four such that the metal frame is divided into four independent frame-bodies; and
   two of the four independent frame-bodies located at two opposite first side edges are configured as antenna radiators, and the other two of the four independent frame-bodies located at two opposite second side edges are not used as antenna radiators.

9. The electronic device of claim 8, wherein
   each of the two independent frame-bodies configured as antenna radiators is spaced apart from a respective side edge of the display screen by a first preset distance;
   each of the two independent frame-bodies not used as antenna radiators is spaced apart from a respective side edge of the display screen by a second preset distance; and
   the second preset distance is smaller than the first present distance.

10. The electronic device of claim 6, wherein
    the spacing portion comprises at least two micro-seams and a metal strip disposed between two adjacent ones of the at least two micro-seams, and the at least two micro-seams are filled with signal shielding material.

11. The electronic device of claim 10, wherein
    a width of the spacing portion is 1.5 mm, 5.0 mm or ranges from 1.5 mm to 5.0 mm;
    a width of each of the at least two micro-seams is 0.05 mm, 0.3 mm or ranges from 0.05 mm to 0.3 mm; and
    a width of the metal strip is 0.1 mm, 0.5 mm or ranges from 0.1 mm to 0.5 mm.

12. An electronic device, comprising:
    a display screen;
    a metal frame surrounding a first portion of a side edge of the display screen and spaced apart from the side edge of the display screen, wherein at least a portion of the metal frame is configured as antenna radiator, a projection of a part of the display screen along a direction perpendicular to a thickness direction of the display screen locates directly on the at least part of the metal frame, a height of the part of the display screen is smaller than a thickness of the display screen;
    a space is defined between the part of the display screen and the at least part of the metal frame antenna radiator; and
    a connecting component surrounding and clung to the side edge of the display screen, wherein the connecting component comprises insulating material and is disposed out of the space;
    wherein the connecting component abuts a top end of the metal frame such that a second portion of the side edge of the display screen clung to the connecting component does not face the metal frame.

13. The electronic device of claim 12, wherein
    the display screen comprises a display panel and a touch-control panel covering the display panel; and
    the connecting component covers a side edge of the touch-control panel and at least a portion of a side edge of the display panel.

14. The electronic device of claim 12, further comprising a plurality of radio frequency (RF) circuits, wherein
the metal frame is divided into a plurality of frame-bodies by a plurality of micro-seam bands; and
at least one of the plurality of frame-bodies is electrically connected with one of the plurality of RF circuits.

15. The electronic device of claim 14, wherein
a first group of the plurality of frame-bodies are coupled with at least one of the plurality of RF circuits, and a second group of the plurality of frame-bodies are not coupled with the plurality of RF circuits; and
a distance between each of the first group of the plurality of frame-bodies and the display screen is larger than a distance between each of the second group of the plurality of frame-bodies and the display screen.

16. The electronic device of claim 14, wherein
each of the plurality of frame-bodies is electrically connected with one of the plurality of RF circuits, and is spaced apart from the display screen.

17. The electronic device of claim 14, wherein
each of the plurality of micro-seam bands comprises at least two micro-seams and a metal strip disposed between the at least two micro-seams, and the at least two micro-seams are filled with signal shielding material.

18. The electronic device of claim 17, wherein
a width of each of the plurality of micro-seam bands ranges from 1.5 mm to 5.0 mm;
a width of each of the at least two micro-seams ranges from 0.05 mm to 0.3 mm; and
a width of the metal strip ranges from 0.1 mm to 0.5 mm.

19. The electronic device of claim 12, further comprising a cover plate covering the display screen; wherein a portion of the connecting component extends to and covers a side edge of the cover plate.

20. The electronic device of claim 12, further comprising a support frame supporting the display screen; wherein the support frame comprises insulating material and is clung to the metal frame.

* * * * *